(12) United States Patent
Wenzel et al.

(10) Patent No.: US 8,707,076 B2
(45) Date of Patent: Apr. 22, 2014

(54) SYSTEM AND METHOD FOR POWER MANAGEMENT OF STORAGE RESOURCES

(75) Inventors: Christiaan Wenzel, Round Rock, TX (US); Radhakrishna Dasari, Round Rock, TX (US); Vishwanath Jayaraman, Austin, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 924 days.

(21) Appl. No.: 11/737,074

(22) Filed: Apr. 18, 2007

(65) Prior Publication Data

US 2008/0259710 A1 Oct. 23, 2008

(51) Int. Cl.
*G06F 1/00* (2006.01)

(52) U.S. Cl.
USPC ........... 713/324; 713/300; 713/320; 711/114; 714/2; 714/3; 714/6.1; 714/6.11; 714/6.2; 714/6.23; 714/6.24; 714/6.3

(58) Field of Classification Search
USPC .......... 713/300, 320, 324; 711/114; 714/2, 3, 714/6.1, 6.11, 6.2, 6.22, 6.23, 6.24, 6.3
See application file for complete search history.

(56) References Cited

U.S. PATENT DOCUMENTS

| | | | | |
|---|---|---|---|---|
| 5,835,703 | A * | 11/1998 | Konno | 714/42 |
| 6,282,670 | B1 * | 8/2001 | Rezaul Islam et al. | 714/6.12 |
| 6,324,655 | B1 * | 11/2001 | Matoba et al. | 714/6.32 |
| 6,859,882 | B2 | 2/2005 | Fung | 713/300 |
| 6,877,011 | B2 * | 4/2005 | Jaskiewicz | 1/1 |
| 6,973,491 | B1 * | 12/2005 | Staveley et al. | 709/224 |
| 6,986,075 | B2 * | 1/2006 | Ackaret et al. | 714/4.5 |
| 7,000,237 | B1 * | 2/2006 | Sinha | 719/318 |
| 7,032,119 | B2 | 4/2006 | Fung | 713/320 |
| 7,228,441 | B2 | 6/2007 | Fung | 713/300 |
| 7,340,616 | B2 * | 3/2008 | Rothman et al. | 713/300 |
| 7,370,220 | B1 * | 5/2008 | Nguyen et al. | 713/330 |
| 7,516,348 | B1 * | 4/2009 | Ofer | 713/324 |
| 7,574,623 | B1 * | 8/2009 | Goel et al. | 714/47.2 |
| 7,587,629 | B2 * | 9/2009 | Okamoto et al. | 714/6.32 |
| 7,643,281 | B2 * | 1/2010 | Okamoto et al. | 361/679.33 |
| 7,689,858 | B2 * | 3/2010 | Koarashi | 714/5.1 |
| 7,747,800 | B2 * | 6/2010 | Zimoto et al. | 710/74 |
| 7,917,810 | B2 * | 3/2011 | Piszczek et al. | 714/43 |
| 8,219,748 | B2 * | 7/2012 | Uehara et al. | 711/114 |
| 2003/0069886 | A1 * | 4/2003 | Jaskiewicz | 707/10 |

(Continued)

OTHER PUBLICATIONS

Henry T. Fung, Application entitled "System, Apparatus and Method for Power-Conserving and Disc-Drive-Life Prolonging Raid Configuration," 17 pages, Sep. 27, 2000.

*Primary Examiner* — Jaweed A Abbaszadeh
(74) *Attorney, Agent, or Firm* — Baker Botts L.L.P.

(57) ABSTRACT

A system and method for power management of storage resources are disclosed. A method may include detecting an occurrence of an event associated with a storage resource disposed in an array of storage resources. The method may further include transitioning the storage resource into a specified power state in response to the detection of the occurrence of the event. A system may include a storage resource and a power management module communicatively coupled to the storage resource. The storage resource may be disposed in an array of storage resources. The power management module may be operable to detect an occurrence of an event associated with the storage resource, and may be operable to transition the storage resource into a specified power state in response to the detection of the occurrence of the event.

9 Claims, 7 Drawing Sheets

(56) References Cited

U.S. PATENT DOCUMENTS

| | | |
|---|---|---|
| 2005/0138284 A1* | 6/2005 | Cohn et al. .................... 711/114 |
| 2005/0268121 A1* | 12/2005 | Rothman et al. .............. 713/300 |
| 2006/0041793 A1* | 2/2006 | Cherian et al. ................. 714/47 |
| 2006/0075283 A1* | 4/2006 | Hartung et al. .................. 714/5 |
| 2006/0212747 A1* | 9/2006 | Okamoto et al. ................. 714/6 |
| 2007/0028041 A1* | 2/2007 | Hallyal et al. ............... 711/114 |
| 2007/0143542 A1* | 6/2007 | Watanabe et al. ............. 711/114 |
| 2008/0104431 A1* | 5/2008 | Shimada ....................... 713/300 |
| 2008/0126701 A1* | 5/2008 | Uehara et al. ................. 711/114 |
| 2008/0126702 A1* | 5/2008 | Zimoto et al. ................ 711/114 |
| 2008/0126839 A1* | 5/2008 | Sangapu et al. ................... 714/5 |
| 2008/0126847 A1* | 5/2008 | Koarashi ........................... 714/6 |
| 2008/0168223 A1 | 7/2008 | Reeves et al. ................. 711/114 |
| 2008/0209246 A1 | 8/2008 | Marks et al. .................. 713/323 |

\* cited by examiner

SYSTEM AND METHOD FOR POWER MANAGEMENT OF STORAGE RESOURCES

TECHNICAL FIELD

The present disclosure relates in general to power management, and more particularly to a system and method for power management of storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual resource."

Implementations of storage resource arrays can range from a few storage resources disposed in a server chassis, to hundreds of storage resources disposed in one or more separate storage enclosures. As densities of storage resources making up arrays have increased, so has the power required for arrays, as well as the heat generated by arrays. Increases in heat generated by storage resources may require sophisticated cooling systems, which in turn may also increase demand for power.

As a specific example, a user may implement a RAID configuration including one or more servers coupled to a number of storage enclosures containing hundreds of storage resources. In a typical configuration, a RAID may include (a) active storage resources making up one or more virtual resources, (b) one or more active spare storage resources (also known as "hot spares") and (c) one or more inactive storage resources (also known as "unused spares"). Using conventional approaches, all storage resources may spin up during initialization or powering up of the storage enclosures, and may remain running until the enclosures are powered down. In such a configuration, the storage resources configured as active spares generally may remain idle until a virtual resource suffers a failure of one of its active storage resources, at which time the virtual resource may rebuild itself using an active spare. However, until such failure occurs, the active spare storage resources, as well as the inactive storage resources, remain fully powered up, spinning, consuming power, and generating heat.

Accordingly, a need has arisen for systems and methods that provide power management of storage resources, particularly power management of active spare and inactive storage resources in an array of storage resources.

SUMMARY

In accordance with the teachings of the present disclosure, disadvantages and problems associated with the management of power in storage resources may be substantially reduced or eliminated. For example, the systems and methods disclosed herein may be technically advantageous because they may provide for greater efficiency in the use of power in storage resources, thereby possibly reducing power requirements for storage resources and possibly reducing heat dissipated by storage resources. In a particular embodiment, a power management module may detect the occurrence of an event associated with a storage resource and, in response to the detection of the occurrence, spin up or spin down the storage resource in order to efficiently use power.

In accordance with one embodiment of the present disclosure, a method for power management of storage resources is provided. The method may include detecting an occurrence of an event associated with a storage resource disposed in an array of storage resources. The method may further include transitioning the storage resource into a specified power state in response to the detection of the occurrence of the event, wherein transitioning the storage resource into a specified power states comprises at least one of (a) spinning up the storage resource from a spun down state and (b) spinning down the storage resource from a spun up state.

In accordance with another embodiment of the present disclosure, an information handling system may include a processor, a memory communicatively coupled to the processor, and a power management module communicatively coupled to the processor and a storage resource disposed in an array of storage resources. The power management module may be operable to detect an occurrence of an event associated with the storage resource, and may be operable to transition the storage resource into a specified power state in response to the detection of the occurrence of the event.

In a further embodiment of the present disclosure, a system for power management of storage resources may include a storage resource and a power management module communicatively coupled to the storage resource. The storage resource may be disposed in an array of storage resources. The power management module may be operable to detect an occurrence of an event associated with the storage resource, and may be operable to transition the storage resource into a specified power state in response to the detection of the occurrence of the event.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 9, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As discussed above, an information handling system may include an array of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "virtual resource."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, and/or others.

Figure 1:
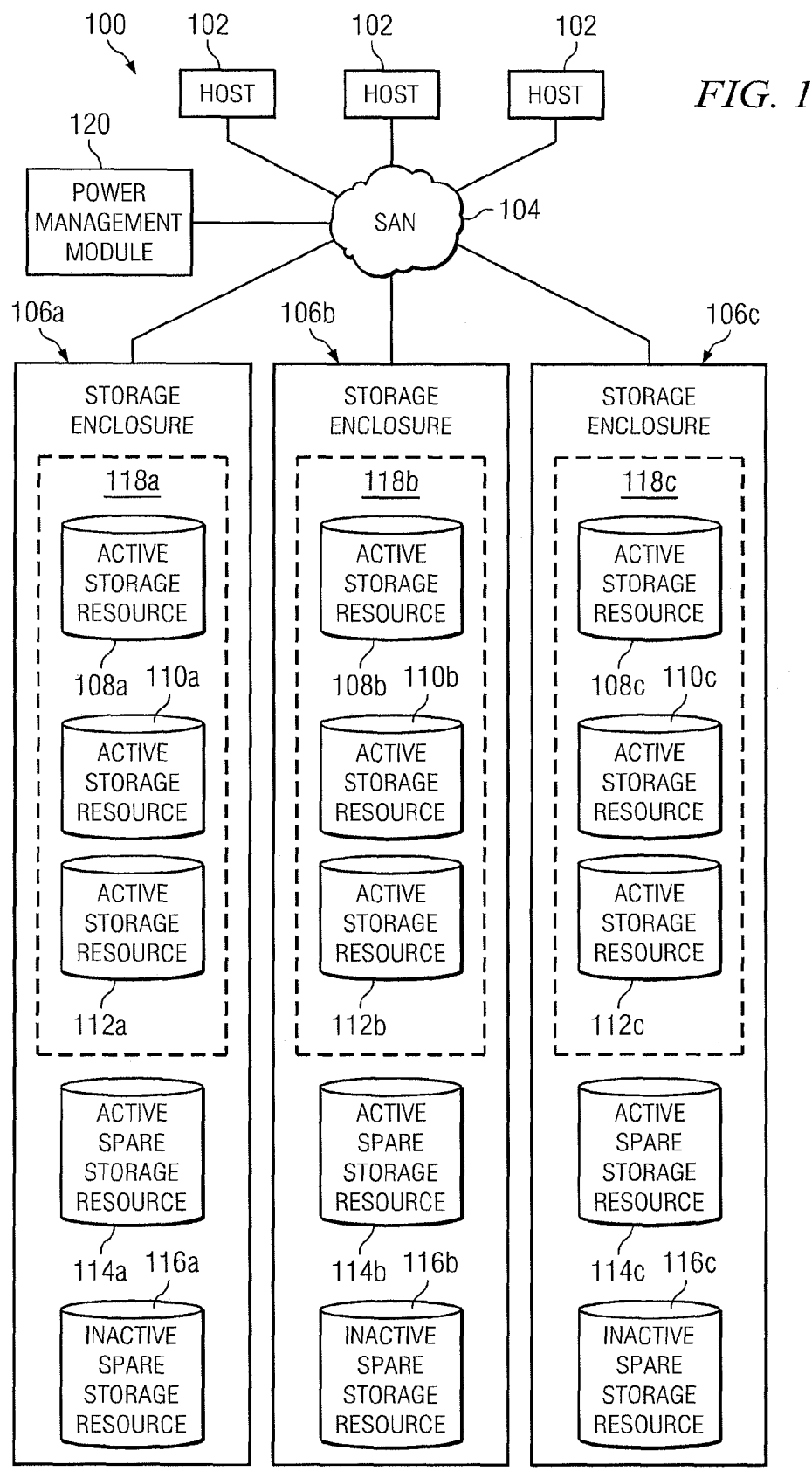
FIG. 1 illustrates a block diagram of an example system for storage including an array of storage resources, in accordance with an embodiment of the present disclosure.

FIG. 1 illustrates a block diagram of an example system 100 for storage using an array of storage resources, in accordance with an embodiment of the present disclosure. As depicted, system 100 may include one or more hosts 102, a storage area network (SAN) 104, one or more storage enclosures 106a, 106b and 106c (referred to generally as storage enclosures 106), and a power management module 120. Each host 102 may comprise an information handling system and may generally be operable to read data from and/or write data to one or more storage resources disposed in storage enclosures 106. In certain embodiments, one or more of hosts 102 may be a server. Although system 100 is depicted as having three hosts 102, it is understood that system 100 may include any number of hosts 102.

SAN 104 may be a network and/or fabric configured to couple hosts 102 to storage resources disposed in storage enclosures 106. In certain embodiments, SAN 104 may allow hosts 102 to connect to storage resources disposed in storage enclosures such that the storage resources appear to the hosts as locally attached storage resources. In the same or alternative embodiments, SAN 104 may include a communication infrastructure, which provides physical connections, and a management layer, which organizes the physical connections, storage resources of storage enclosures 106, and hosts 102. In the same or alternative embodiments, SAN 104 may allow block I/O services and/or file access services to storage resources disposed in storage enclosures 106. SAN 104 may be implemented as or part of a local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as media). SAN 104 may transmit media using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. SAN 104 and its various components may be implemented using hardware, software, or any combination thereof.

As depicted in FIG. 1, each storage enclosure 106 may be configured to hold and power one or more storage resources 108, 110, 112, 114 and/or 116, and may be communicatively coupled to hosts 102 and/or SAN 104, in order to facilitate communication of media between hosts 102 and storage resources 108-116. Storage resources 108-116 may include hard disk drives, magnetic tape libraries, optical disk drives, magneto-optical disk drives, compact disk drives, compact disk arrays, disk array controllers, and/or any other system, apparatus or device operable to store media. Although the embodiment shown in FIG. 1 depicts each storage enclosure 106 having five storage resources 108-116, it is understood that each storage enclosure 106 may have any number of storage resources 108-116. In addition, although system 100 is depicted as having three storage enclosures 106, it is understood that system 100 may include any number of storage enclosures 106.

As depicted in FIG. 1, power management module (PMM) 120 may be communicatively coupled to SAN 104 and storage enclosures 106. PMM 120 may be operable to issue commands and/or other signals to manage and/or control the power consumption of storage resources 108-116. In certain embodiments, PMM 120 may be operable to transition a storage resource 108-116 into a specified power state in response to an event associated with that storage resource 108-116, as discussed in greater detail below. In some embodiments, transitioning a storage resource 108-116 into a specified power state may include spinning up the storage resource 108-116. In the same or alternative embodiments, transitioning a storage resource 108-116 into a specified power state may include spinning down the storage resource 108-116. Although the embodiment shown in FIG. 1 depicts system 100 as having one PMM 120, it is understood that system 100 may include any number of PMMs 120. Further, although PMM 120 is depicted as being communicatively coupled via SAN 104 to storage enclosures 106 and hosts 102, it is understood that PMM 120 may be disposed in one or more hosts 102 and/or one or more storage enclosures 106.

In certain embodiments, PMM 120 may be an integral part of an information handling system. In the same or alternative embodiments, PMM 120 may be communicatively coupled to a processor and/or memory disposed with the information handling system.

In addition, although FIG. 1 depicts that hosts 102 are communicatively coupled to storage enclosures 106 via SAN 104, it is understood that one or more hosts 102 may be communicatively coupled to one or more storage enclosures 106 without the need of SAN 104 or another similar network. For example, in certain embodiments, one or more storage enclosures 106 may be directly coupled and/or locally attached to one or more hosts 102. Further, although storage resources 108-116 are depicted as being disposed within storage enclosures 106, it is understood that system 100 may include storage resources 108-116 that are communicatively coupled to a host 102 and/or SAN 104, but are not disposed within a storage enclosure 106 (e.g., storage resources 108-116 may include one or more a standalone disk drives).

In operation, one or more storage resources 108-116 may appear to an operating system executing on hosts 102 as a single logical storage unit or virtual resource 118. For example, as depicted in FIG. 1, virtual resource 118*a* comprises storage resources 108*a*, 110*a* and 112*a*. Thus, hosts 102 may "see" virtual resource 118*a* instead of seeing each individual storage resource 108*a*, 110*a* and 112*a*.

In the embodiment of system 100 shown in FIG. 1, each virtual resource 118 includes one or more storage resources 108, 110 and 112 referred to as "active" storage resources. As used in this disclosure, the term "active storage resource" is used to denote a storage resource that is included in a virtual resource 118. In certain embodiments, a virtual resource 118 may comprise a redundant array of storage resources, wherein at least one of the storage resources making up the virtual resource enables data redundancy in order to avoid loss of data in the event of failure and/or removal of one of the storage resources making up the virtual resource. In the same or alternative embodiments, virtual resource 118 may be implemented using a RAID standard.

In addition to active storage resources 108-112, system 100 may include one or more storage resources 114 acting as "active spares." An active spare storage resource 114 may also be referred to as a "hot spare" (particularly when used in a RAID implementation) and be any storage resource that is configured to replace an active storage resource 108-112 that has failed and/or been removed. In certain embodiments, system 100 may be configured such that a detection of a failure of an active storage resource 108-112 automatically initiates the replacement of the failed storage resource with an active spare storage resource 114. In embodiments employing redundancy, the availability of active spare storage resources 114 may reduce a repair period during which a second storage resource failure in the same redundancy group can result in loss of data. System 100 may also include one or more storage resources 116 acting as "inactive resources" or "unused storage resources." In some embodiments, inactive storage resources 116 may not be configured as active storage resources or active spare storage resources, but may be later configured to be used as active storage resources and/or active spare storage resources.

Although in the embodiment depicted in FIG. 1 each virtual resource 118 is shown as including three storage resources 108-112, it is understood that a virtual resource 118 may comprise any number of storage resources. In addition, although each virtual resource 118 is depicted as including only storage resources 108-112 disposed in the same storage enclosure 106, it is understood that a virtual resource 118 may include storage resources 108-112 disposed in different storage enclosures 106. For example, in one embodiment, virtual resource 118*a* may comprise active storage resources 108*a*, 110*a* and 110*c*.

Figure 2:
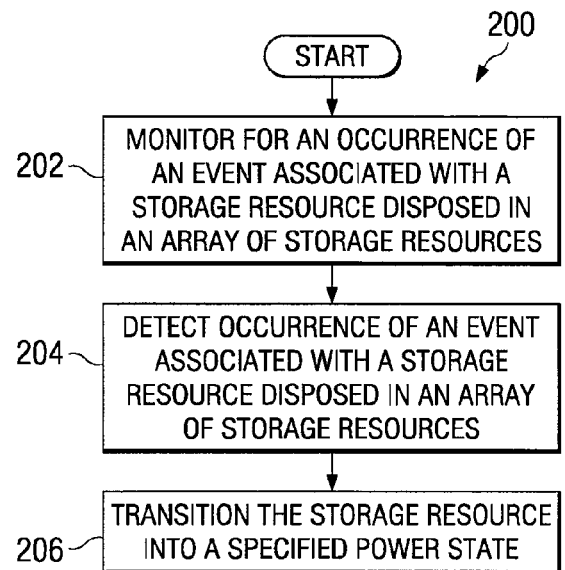
FIG. 2 illustrates a flow chart of a method for power management of storage resources disposed in an array of storage resources, in accordance with an embodiment of the present disclosure.

FIG. 2 illustrates a flow chart of a method 200 for power management of storage resources 108-116 disposed in an array of storage resources, in accordance with an embodiment of the present disclosure. In one embodiment, method 200 includes monitoring for and detecting an event associated with a storage resource 108-116, and transitioning that storage resource into a specified power state in response to the detection of the event.

According to one embodiment, method 200 preferably begins at step 202. As noted above, teachings of the present disclosure may be implemented in a variety of configurations of system 100. As such, the preferred initialization point for method 200 and the order of the steps 202-206 comprising method 200 may depend on the implementation chosen.

At step 202, PMM 120 or another component of system 100 may monitor for an occurrence of an event associated with a storage resource 108-116. At step 204, PMM 120 or another component of system 100 may detect the occurrence of an event associated with a particular storage resource 108-116. At step 206, PMM 120 or another component of system 100 may transition and/or cause the transition of (e.g., by issuing a command and/or other signal) the particular storage resource 108-116 into a specified power state. For example, in certain embodiments of method, PMM 120 may spin up the particular storage resource 108-116 in response to detection of an event. In the same or alternative embodiments, PMM 120 may spin down the particular storage resource 108-116 in response to detection of an event. As used in this disclosure, the term "event" may refer to any happening and/or occurrence in system 100 that affects the operation, condition, configuration, and/or state of a storage resource 108-116, including without limitation the following:

- initialization of an array of storage resources 108-116, as described in greater detail below with reference to FIG. 3;
- expansion of a virtual resource 118 to include a storage resource 108-116, as described in greater detail below with reference to FIG. 4;
- addition of a storage resource to an array of storage resources 108-116, as described in greater detail below with reference to FIG. 5;
- removal of a storage resource 108-116 from an array of storage resources, as described in greater detail below with reference to FIG. 6;
- rebuilding of a virtual resource 118 using a storage resource 108-116, as described in greater detail below with reference to FIG. 7;
- issuance of a configuration command associated with a storage resource 108-116, as described in greater detail below with reference to FIG. 8; and
- evaluation of the condition of a storage resource 108-116, as described in greater detail below with reference to FIG. 9.

Figure 3:
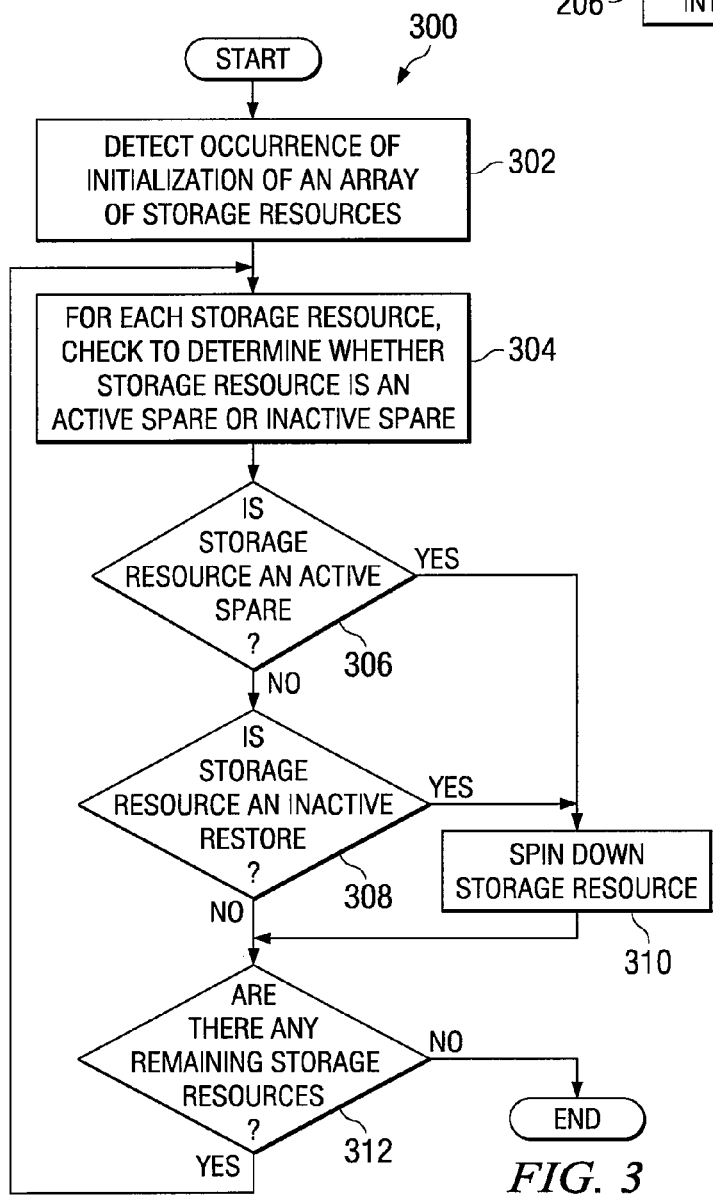
FIG. 3 illustrates a flow chart of a method for power management of storage resources disposed in an array of storage resources, in connection with initialization of the array of storage resources, in accordance with an embodiment of the present disclosure.

FIG. 3 illustrates a flow chart of a method 300 for power management of storage resources 108-116 disposed in an array of storage resources, in connection with initialization of the array of storage resources 108-116, in accordance with an embodiment of the present disclosure. In one embodiment, method 300 includes detecting the occurrence of initialization of an array of storage resources 108-116, and determining whether each storage resource is an active storage resource 108-112, an active spare storage resource 114 or an inactive storage resource 116. If a particular storage resource is an active spare storage resource 114, or an inactive storage resource 116, the particular storage resource may be spun down to conserve power.

According to one embodiment, method 300 preferably begins at step 302. As noted above, teachings of the present disclosure may be implemented in a variety of configurations of system 100. As such, the preferred initialization point for method 300 and the order of the steps 302-312 comprising method 300 may depend on the implementation chosen.

At step 302, PMM 120 or another component of system 100 may detect the occurrence of the initialization of the array of storage resources 108-116. Initialization may include, among other things, powering up or booting up of an array of storage resources 108-116 and/or storage enclosures 106 comprising the storage resources. At step 304, for each storage resource 108-116 of the array, PMM 120 or another component of system 100 may check to determine whether such storage resource 108-116 is an active spare storage resource 114 or an inactive storage resource 116.

If at step 306, a particular storage resource is determined to be an active spare storage resource 114, execution of method 300 may proceed to step 310; otherwise, method 300 may proceed to step 308. If at step 308, a particular storage resource is determined to be an inactive storage resource 116, execution of method 300 may proceed to step 310; otherwise, method 300 may proceed to step 312.

At step 310, in response to determining that a particular storage resource is an active spare storage resource 114 or an inactive storage resource 116, PMM 120 or another component of system 100 may spin down the particular storage resource. At step 312, PMM 120 or another component of system 100 may determine if there are any other remaining storage resources that have not been checked at step 304. If one or more storage resources 108-116 have not yet been checked, method 300 may proceed again to step 304, where one or more of steps 304-310 may be repeated for another storage resource. If, at step 312, there are no remaining storage resources 108-116 to be checked, method 312 may end.

Figure 4:
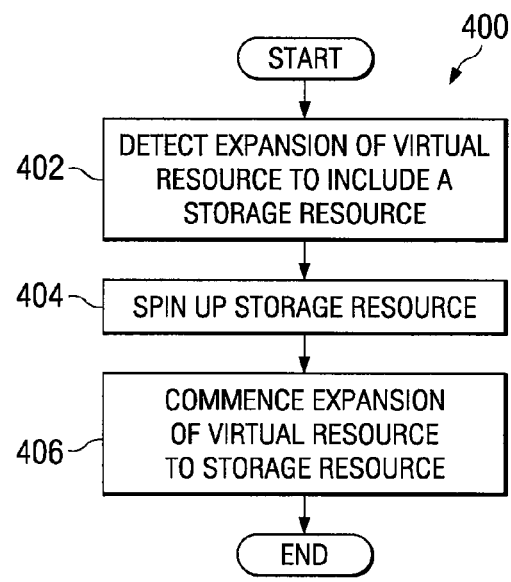
FIG. 4 illustrates a flow chart of a method for power management of storage resources disposed in an array of storage resources, in connection with expansion of a virtual resource to include a storage resource, in accordance with an embodiment of the present disclosure.

FIG. 4 illustrates a flow chart of a method 400 for power management of storage resources 108-116 disposed in an array of storage resources, in connection with an expansion of a virtual resource 108 to include an active spare or inactive storage resource 114-116, in accordance with an embodiment of the present disclosure. For example, a system administrator or other user may wish to expand virtual resource 118a comprising storage resources 108a, 110a and 112a to include an active spare storage resource 114 or an inactive storage resource 116, in order to increase the storage capacity of virtual resource 118a. In one embodiment, method 400 includes detection of a command, message and/or other notification to expand a virtual resource 118 to include another storage resource 114-116. The storage resource 114-116 to which virtual resource 118 is to be expanded may be spun up, and expansion of the virtual resource 118 may begin.

According to one embodiment, method 400 preferably begins at step 402. As noted above, teachings of the present disclosure may be implemented in a variety of configurations of system 100. As such, the preferred initialization point for method 400 and the order of the steps 402-406 comprising method 400 may depend on the implementation chosen.

At step 402, PMM 120 or another component of system 100 may detect that a command, message and/or other notification has been issued from a host 102 or another component of system 100 to expand a virtual resource 118 to include an active spare or inactive storage resource 114-116. At step 404, PMM 120 or another component of system 100 may identify a storage resource 114-116 to which the virtual resource 118 is to be expanded, and spin up the identified storage resource 114-116. The identified storage resource 114-116 may require spinning up prior to expansion of the virtual resource 118 if such storage resource was spun down upon initialization (e.g., as depicted in FIG. 3), or spun down after being added to system 100 (as depicted in FIG. 5). At step 406, system 100 may expand virtual resource 118 to include the identified storage resource, and method 400 may end.

Figure 5:
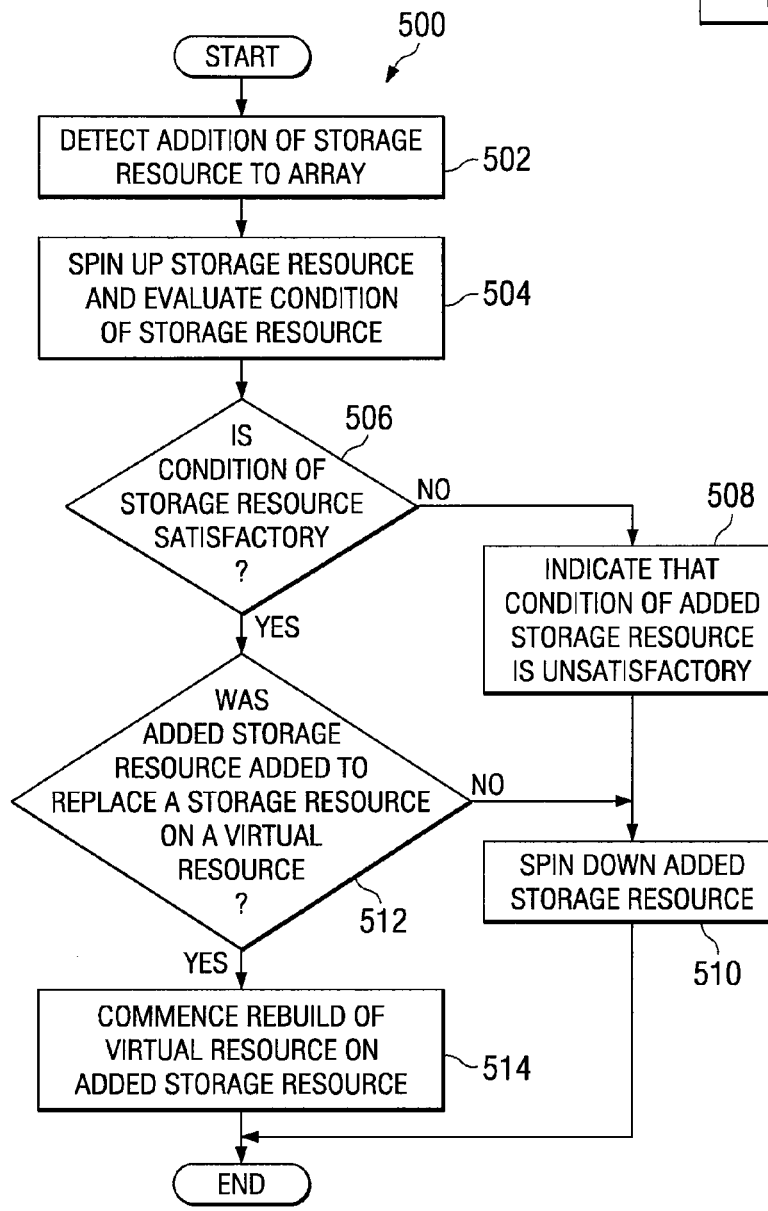
FIG. 5 illustrates a flow chart of a method for power management of storage resources disposed in an array of storage resources, in connection with the addition of a storage resource to the array of storage resources, in accordance with an embodiment of the present disclosure.

FIG. 5 illustrates a flow chart of a method 500 for power management of storage resources disposed in an array of storage resources, in connection with the addition of a storage resource to the array of storage resources 108-116, in accordance with an embodiment of the present disclosure. For example, a system administrator or other user may wish to add a storage resource to an existing array of storage resources 108-116 by adding the new storage resource to a storage enclosure 106 or otherwise communicatively coupling the new storage resource to hosts 102. In certain embodiments, a system administrator or other user may add a new storage resource without powering down system 100 or its components, thus performing a "hot-add" of the storage resource to system 100. In certain instances, a system administrator or other user may add a new storage resource in order to replace a failed storage resource 108-112 of a virtual resource 118 when an active spare virtual resource 114 is not available. In one embodiment, method 500 includes the detection of an addition of a storage resource to an array. The added storage resource may be spun up and its condition evaluated. If the condition of the added storage resource is satisfactory, and the storage resource was added to replace a storage resource 108-112 of a virtual resource 118, the virtual resource 118 may be rebuilt using the added storage resource.

According to one embodiment, method 500 preferably begins at step 502. As noted above, teachings of the present disclosure may be implemented in a variety of configurations of system 100. As such, the preferred initialization point for method 500 and the order of the steps 502-514 comprising method 500 may depend on the implementation chosen.

At step 502, PMM 120 or another component of system 100 may detect the addition of a storage resource to an array of storage resources 108-116. At step 504, PMM 120 or another component of system 100 may spin up the added storage resource and evaluate the condition of the added storage resource. Evaluation of the condition of the added storage resource may comprise checking the "health" of the added storage resource to determine whether or not it is functioning properly. If, at step 506, it is determined that the condition of the added storage resource is not satisfactory, method 500 may proceed to step 508. Otherwise, if it is determined that the condition of added storage resource is satisfactory, method 500 may proceed to step 512.

At step 508, PMM 120 or another component of system 100 may indicate that the condition of the added storage resource is unsatisfactory. For example, PMM 120 or another component of system 100 may provide a message to a system administrator or other user that the condition of the added storage resource is unsatisfactory. At step 510, PMM 120 or another component of system 100 may spin down the added storage resource in order to reduce power consumption of system 100. After the completion of step 510, method 500 may end.

At step 512, in response to a determination that the condition of the added storage resource is satisfactory, PMM 120 or another component of system 100 may determine whether the added storage resource was added to replace an active storage resource 108-112 of a virtual resource 118. If the added storage resource was not added to replace an active storage resource 108-112 of a virtual resource 118, method 500 may proceed to step 510 where the added storage resource may be spun down to reduce power consumption. On the other hand, if the added storage resource was added to replace an active storage resource 108-112 of a virtual resource 118 (for example, in order to replace a storage resource that has failed), method 500 may proceed to step 514. At step 514, PMM 120 or another component of system 100 may commence rebuilding of virtual resource 118 using the added storage resource. After completion of step 514, method 500 may end.

Figure 6:
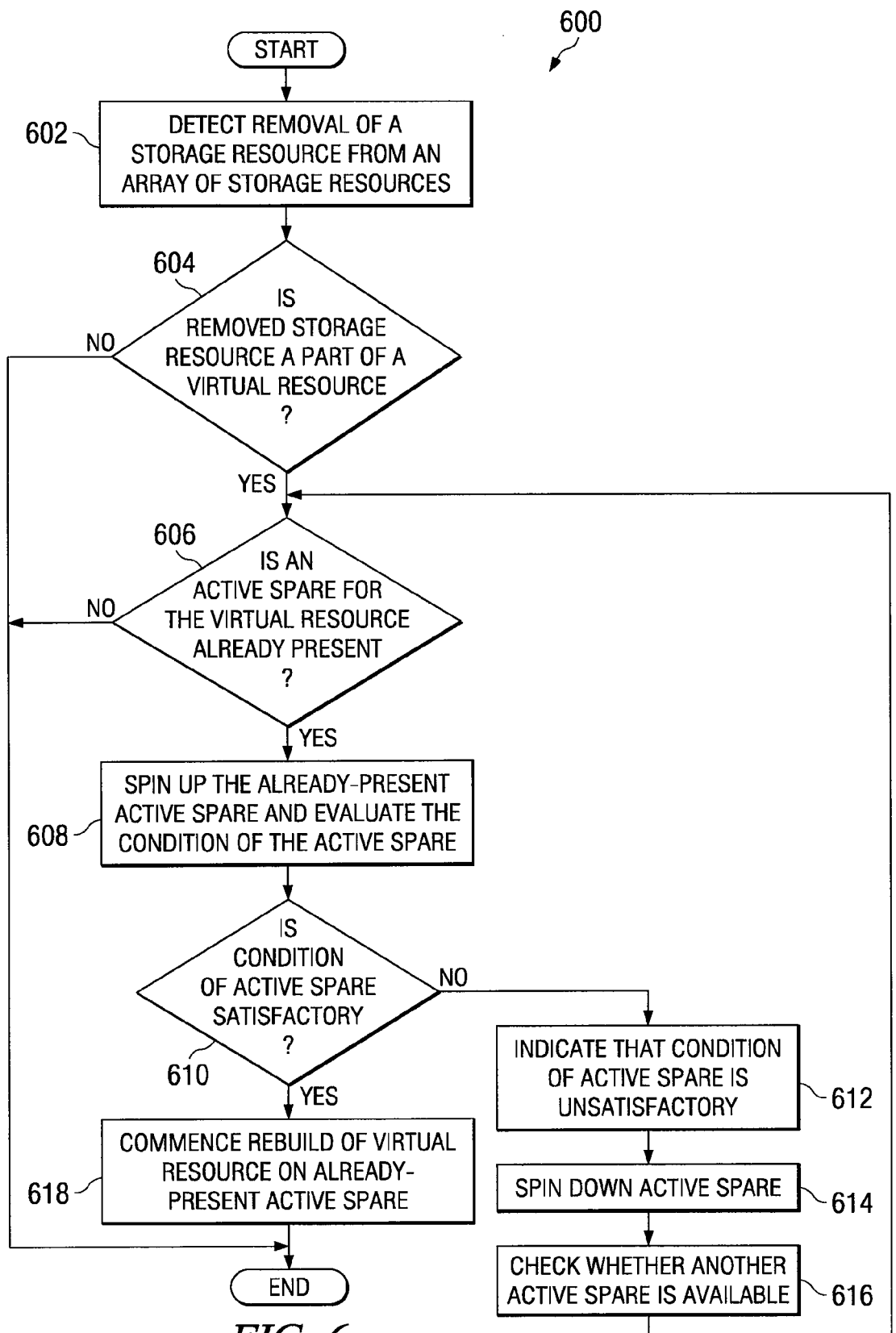
FIG. 6 illustrates a flow chart of a method for power management of storage resources disposed in an array of storage resources, in connection with the removal of a storage resource from the array of storage resources, in accordance with an embodiment of the present disclosure.

FIG. 6 illustrates a flow chart of a method 600 for power management of storage resources 108-116 disposed in an array of storage resources, in connection with the removal of a storage resource 108-116 from the array of storage resources, in accordance with an embodiment of the present disclosure. In one embodiment, removal of a storage resource 108-116 may be detected. If the removed storage resource is part of a virtual resource 118, and an active spare storage resource 114 is available to rebuild virtual resource 118, the active spare resource 114 may be spun up and virtual resource 118 may be rebuilt using the available active spare storage resource 114.

According to one embodiment, method 600 preferably begins at step 602. As noted above, teachings of the present disclosure may be implemented in a variety of configurations of system 100. As such, the preferred initialization point for method 600 and the order of the steps 602-618 comprising method 600 may depend on the implementation chosen.

At step 602, PMM 120 or another component of system 100 may detect the removal of a storage resource 108-116 from system 100. At step 604, PMM 120 or another component of system 100 may determine whether the removed storage resource was an active storage resource 108-112 of a virtual resource 118. If the removed storage resource was an active storage resource 108-112, method 600 may proceed to step 606. Otherwise, if the removed storage resource was not an active storage resource 108-112, method 600 may end.

At step 606, PMM 120 or another component of system 100 may determine whether an active spare storage resource 114 is available to the virtual resource 118 from which the removed storage resource was removed. If an active spare storage resource 114 is available, method 600 may proceed to step 608. Otherwise, if an active spare storage resource 114 is not available, method 600 may end.

At step 608, PMM 120 or another component of system 100 may spin up and evaluate the condition of the available active spare storage resource 114. The available active spare storage resource 114 may require spinning up prior to rebuilding of virtual resource 118 if such storage resource was spun down upon initialization (e.g., as depicted in FIG. 3), or spun down after being added to system 100 (e.g., as depicted in FIG. 5). Evaluation of the condition of the available active spare storage resource 114 may comprise checking the "health" of the active spare storage resource 114 to determine whether or not it is functioning properly.

If, at step 610, it is determined that the condition of the available active spare storage resource 114 is not satisfactory, method 600 may proceed to step 612. Otherwise, if it is determined that the condition of available active spare storage resource 114 is satisfactory, method 600 may proceed to step 618. At step 612, PMM 120 or another component of system 100 may indicate that the condition of the available active spare storage resource 114 is unsatisfactory. For example, PMM 120 or another component of system 100 may provide a message to a system administrator or other user that the condition of the available active spare storage resource 114 is unsatisfactory. At step 614, PMM 120 or another component of system 100 may spin down the available active spare storage resource 114 in order to reduce power consumption of system 100.

At step 616, PMM 120 or another component of system 100 may check whether another active spare storage resource 114 is available for rebuilding virtual resource 118. After step 616, method 600 may proceed to step 606, where one or more of steps 606-616 may be repeated for another active spare storage resource 114.

At step 618, PMM 120 or another component of system 100 may commence rebuilding of virtual resource 118 using the available active spare storage resource 114. After completion of step 618, method 600 may end.

Figure 7:
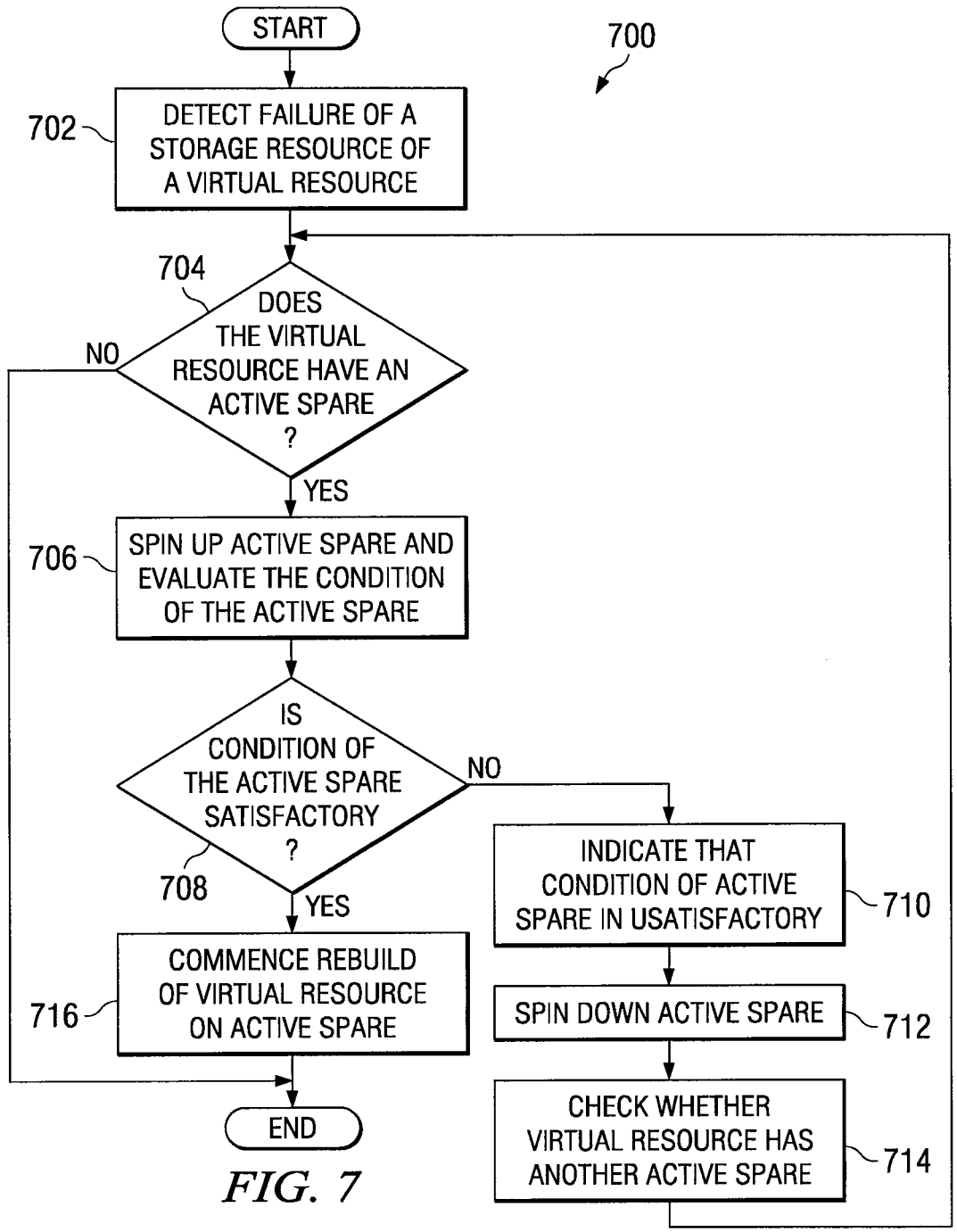
FIG. 7 illustrates a flow chart of a method for power management of storage resources disposed in an array of storage resources, in connection with the rebuilding of a virtual resource using a storage resource, in accordance with an embodiment of the present disclosure.

FIG. 7 illustrates a flow chart of a method 700 for power management of storage resources 108-116 disposed in an array of storage resources, in connection with the rebuilding of a virtual resource 118 using an active spare storage resource 114, in accordance with an embodiment of the present disclosure. For example, if an active storage resource 108-112 of a virtual resource 118 fails, system 100 may be operable to rebuild the virtual resource 118 using an active spare storage resource 114. In one embodiment, failure of an active storage resource 108-112 of a virtual resource 118 may be detected. If an active spare storage resource 114 is available to rebuild the virtual resource 118, the active spare resource 114 may be spun up and the virtual resource 118 may be rebuilt using the active spare storage resource 114.

According to one embodiment, method 700 preferably begins at step 702. As noted above, teachings of the present disclosure may be implemented in a variety of configurations of system 100. As such, the preferred initialization point for method 700 and the order of the steps 702-716 comprising method 700 may depend on the implementation chosen.

At step 702, PMM 120 or another component of system 100 may detect the failure of a storage resource 108-112 of a virtual resource in system 100. At step 704, PMM 120 or another component of system 100 may determine whether an active spare storage resource 114 is available to the virtual resource 118 experiencing the failure. If an active spare storage resource 114 is available, method 700 may proceed to step 706. Otherwise, if an active spare storage resource 114 is not available, method 700 may end.

At step 708, PMM 120 or another component of system 100 may spin up and evaluate the condition of the available active spare storage resource 114. The available active spare storage resource 114 may require spinning up prior to rebuilding of the virtual resource 118 if such storage resource was spun down upon initialization (e.g., as depicted in FIG. 3), or spun down after being added to system 100 (e.g., as depicted in FIG. 5). Evaluation of the condition of the available active spare storage resource 114 may comprise checking the "health" of the active spare storage resource 114 to determine whether or not it is functioning properly.

If, at step 708, it is determined that the condition of the available active spare storage resource 114 is not satisfactory, method 700 may proceed to step 710. Otherwise, if it is determined that the condition of available active spare storage resource 114 is satisfactory, method 700 may proceed to step 716. At step 710, PMM 120 or another component of system 100 may indicate that the condition of the available active spare storage resource 114 is unsatisfactory. For example, PMM 120 or another component of system 100 may provide a message to a system administrator or other user that the condition of the available active spare storage resource 114 is unsatisfactory. At step 712, PMM 120 or another component of system 100 may spin down the available active spare storage resource 114 in order to reduce power consumption of system 100.

At step 714, PMM 120 or another component of system 100 may check whether another active spare storage resource 114 is available for rebuilding of the virtual resource 118. After step 714, method 700 may proceed to step 704, where one or more of steps 704-714 may be repeated for another available active spare storage resource 114.

At step 716, PMM 120 or another component of system 100 may commence rebuilding of the virtual resource 118 using the available active spare storage resource 114. After completion of step 716, method 700 may end.

Figure 8:
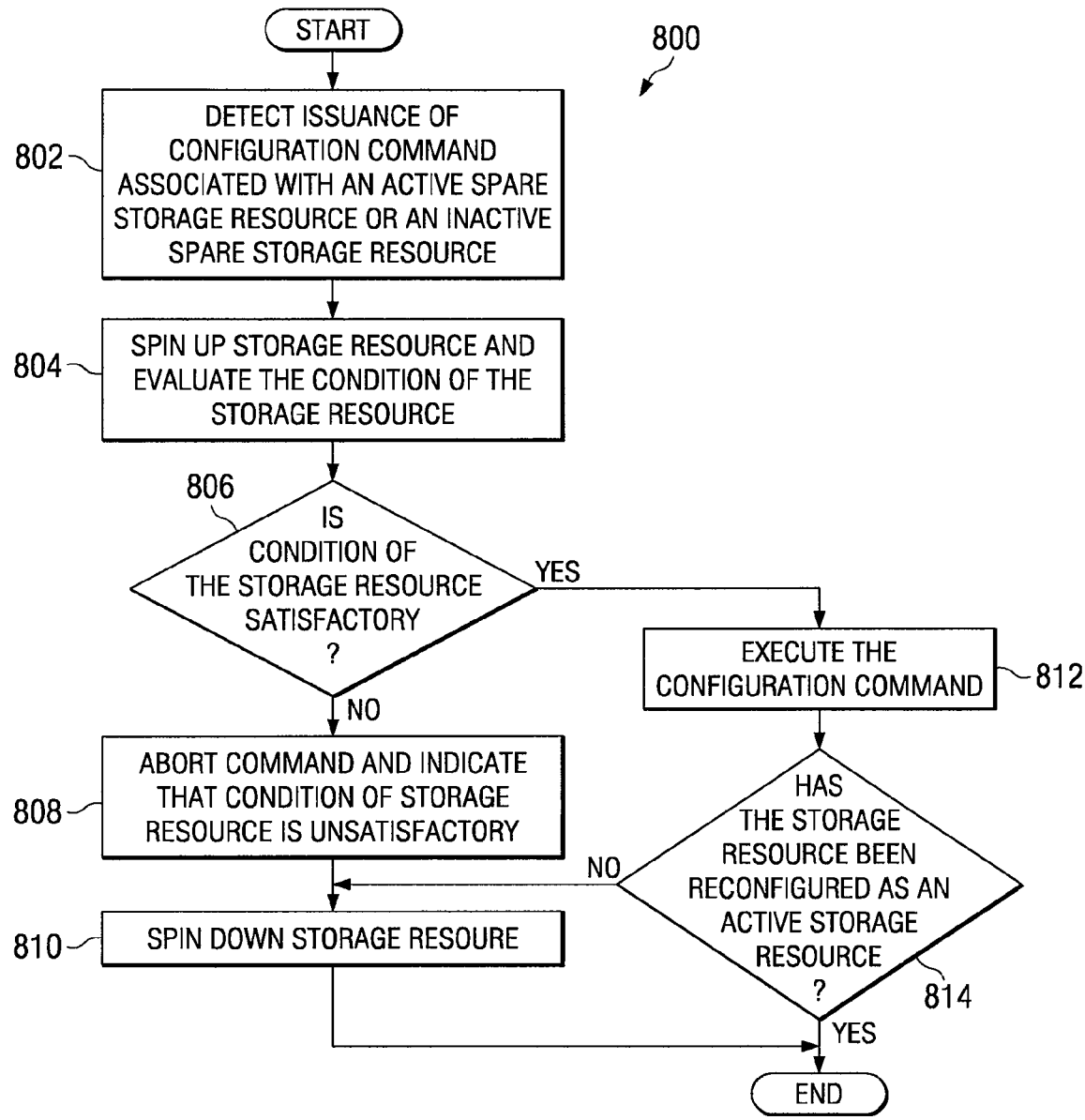
FIG. 8 illustrates a flow chart of a method for power management of storage resources disposed in an array of storage resources, in connection with the issuance of a configuration command associated with a storage resource, in accordance with an embodiment of the present disclosure.

FIG. 8 illustrates a flow chart of a method 800 for power management of storage resources 108-116 disposed in an array of storage resources, in connection with the issuance of a configuration command associated with an active spare or inactive storage resource 114-116, in accordance with an embodiment of the present disclosure. For example, a host 102 or another component of system 100 may issue one or more commands to change the configuration of an active spare storage resource 114 or an inactive storage resource 116. In certain embodiments, a configuration command may be operable to change an active spare storage resource 114 into an active storage resource 108-112 or an inactive storage resource 116. In the same or alternative embodiments, a configuration command may be operable to change an inactive storage resource 116 into an active storage resource 108-112 or an active spare storage resource 114. In one embodiment, issuance of a configuration command associated with an active spare storage resource 114 or an inactive storage resource 116 may be detected. The storage resource 114-116 may be spun up and its condition evaluated. If the condition of the storage resource is satisfactory, the configuration command may be executed.

According to one embodiment, method 800 preferably begins at step 802. As noted above, teachings of the present disclosure may be implemented in a variety of configurations of system 800. As such, the preferred initialization point for method 800 and the order of the steps 802-814 comprising method 800 may depend on the implementation chosen.

At step 802, PMM 120 or another component of system 100 may detect the issuance of a configuration command associated with an active spare storage resource 114 or an inactive storage resource 116. At step 804, PMM 120 or another component of system 100 may spin up and evaluate the condition of the spare storage resource 114-116. The spare storage resource 114-116 may require spinning up prior to rebuilding of virtual resource 118 if such storage resource was spun down upon initialization (e.g., as depicted in FIG. 3), or spun down after being added to system 100, (e.g., as depicted in FIG. 5). Evaluation of the condition of the spare storage resource 114-116 may comprise checking the "health" of the spare storage resource 114-116 to determine whether or not it is functioning properly.

If, at step 806, it is determined that the condition of the spare storage resource 114-116 is not satisfactory, method 800 may proceed to step 808. Otherwise, if it is determined that the condition of spare storage resource 114, 116 is satisfactory, method 800 may proceed to step 812. At step 808, PMM 120 or another component of system 100 may abort the configuration command and indicate that the condition of the spare storage resource 114-116 is unsatisfactory. For example, PMM 120 or another component of system 100 may provide a message to a system administrator or other user that the condition of the spare storage resource 114-116 is unsatisfactory. At step 810, PMM 120 or another component of system 100 may spin down the spare storage resource 114-116 in order to reduce power consumption of system 100. After completion of step 810, method 800 may end.

At step 812, in response to the determination that the condition of the spare storage resource 114-116 is satisfactory, system 100 may execute the configuration command. At step 814, PMM 120 or another component of system 100 may determine whether the spare storage resource 114-116 has been reconfigured as an active storage resource 108-112 of a virtual resource 118. If it is determined that spare storage resource 114-116 has not been reconfigured as an active storage resource 108-112, method 800 may proceed to step 810, where the spare storage resource 114-116 may be spun down in order to reduce power consumption of system 100. Otherwise, if it is determined that spare storage resource 114-116 has been reconfigured as an active storage resource 108-112, the storage resource may remain spun up, and method 800 may end.

Figure 9:
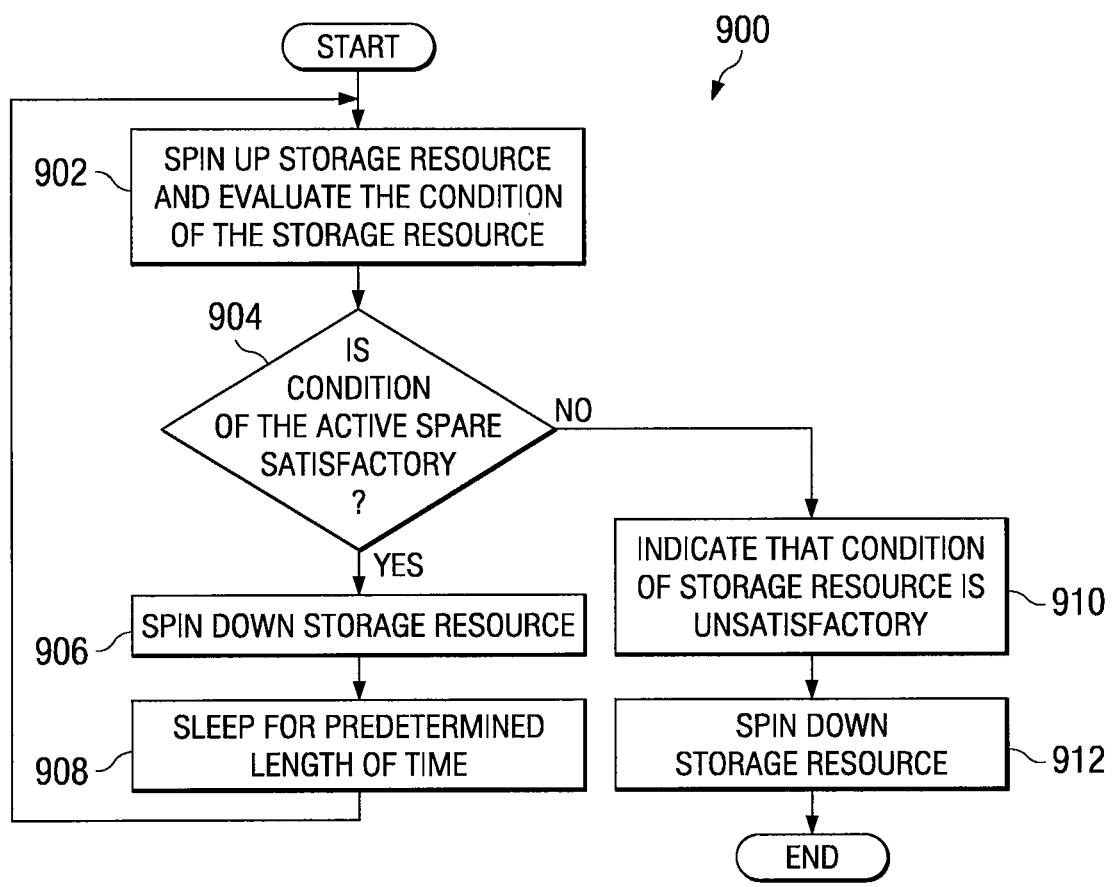
FIG. 9 illustrates a flow chart of a method for power management of storage resources disposed in an array of storage resources, in connection with the evaluation of the condition of the storage resource, in accordance with an embodiment of the present disclosure.

FIG. 9 illustrates a flow chart of a method 900 for power management of storage resources 114-116 disposed in an array of storage resources, in connection with the evaluation of the condition of a storage resource 114-116. For example, from time to time, a system administrator or other user may desire to evaluate the condition of active spare storage resources 114 and/or inactive storage resources 116 to ensure the operability of the storage resources. In one embodiment, an active spare or inactive storage resource 114-116 is spun up and its condition is evaluated. If the condition is determined to be unsatisfactory, an indication is made that the condition is unsatisfactory. Otherwise, the active spare or inactive storage resource 114-116 is spun down, and may sleep for a predetermined length of time before its condition is again evaluated.

According to one embodiment, method 900 preferably begins at step 902. As noted above, teachings of the present disclosure may be implemented in a variety of configurations of system 900. As such, the preferred initialization point for method 900 and the order of the steps 902-912 comprising method 900 may depend on the implementation chosen.

At step 902, PMM 120 or another component of system 100 may spin up and evaluate the condition of a spare storage resource 114-116. The spare storage resource 114-116 may require spinning up prior to rebuilding of virtual resource 118 if such storage resource was spun down upon initialization (e.g., as depicted in FIG. 3), or spun down after being added to system 100 (e.g., as depicted in FIG. 5). Evaluation of the condition of the spare storage resource 114-116 may comprise checking the "health" of the spare storage resource 114 to determine whether or not it is functioning properly.

If, at step 904, it is determined that the condition of the spare storage resource 114-116 is not satisfactory, method 900 may proceed to step 910. Otherwise, if it is determined that the condition of spare storage resource 114, 116 is satisfactory, method 900 may proceed to step 906. At step 906, PMM 120 or another component of system 100 may spin down the spare storage resource 114-116 in order to reduce power consumption of system 100. At step 908, method 900 may sleep for a predetermined period of time, after which it may return to step 902 to again spin up the spare storage resource 114-116 after the predetermined time has elapsed.

At step 910, in response to a determination at step 904 that the condition of the spare storage resource 114-116 is unsatisfactory, PMM 120 or another component of system 100 may indicate that the condition of the spare storage resource 114-116 is unsatisfactory. For example, PMM 120 or another component of system 100 may provide a message to a system administrator or other user that the condition of the spare storage resource 114-116 is unsatisfactory. At step 912, PMM 120 or another component of system 100 may spin down the spare storage resource 114-116 in order to reduce power consumption of system 100. After completion of step 912, method 900 may end.

Using the methods and systems disclosed herein, the power consumption and heat dissipation of a system comprising an array of storage resources may be improved. Because the methods and systems disclosed may allow for strategic spinning down of spare storage resources that are not used by virtual resources, and may allow for strategic spinning up of spare storage resources in certain instances, the availability of spare storage resources may be retained, with lowered power consumption and/or heat dissipation as compared with traditional approaches.

Although the present disclosure has been described in detail, it should be understood that various changes, substitutions, and alterations can be made hereto without departing from the spirit and the scope of the invention as defined by the appended claims.

What is claimed is:

1. A method for power management of storage resources, comprising:
   detecting an issuance of a configuration command associated with a spare storage resource disposed in an array of storage resources, the spare storage resource being at least partially powered on and in a spun down state;
   based on the issuance of the configuration command, spinning up the spare storage resource from the spun down state and evaluating the condition of the spare storage resource to determine whether the spare storage resource is functioning properly;
   based on the spare storage resource functioning properly, executing the configuration command to transition the spare storage resource into an active storage resource, the spare storage resource at least partially powered on before transitioning the spare storage resource into the active storage resource; and
   based on the spare storage resource not functioning properly, spinning down the spare storage resource, the spare storage resource being at least partially powered on.

2. The method of claim 1, wherein the array of storage resources comprises a redundant array of independent disks (RAID).

3. The method of claim 1, wherein evaluating the condition of the spare storage resource comprises determining whether the spare storage resource is an active spare storage resource, an inactive spare storage resource, or an unhealthy storage resource.

4. An information handling system comprising:
   a processor;
   a memory communicatively coupled to the processor;
   a power management module communicatively coupled to the processor and a spare storage resource disposed in an array of storage resources, the power management module operable to:
      detect an issuance of a configuration command associated with the spare storage resource, the spare storage resource being at least partially powered on and in a spun down state;
      based on the issuance of the configuration command, spin up the spare storage resource from the spun down state and evaluate the condition of the spare storage resource to determine whether the spare storage resource is functioning properly;
      based on the spare storage resource functioning properly, execute the configuration command to transition the spare storage resource into an active storage resource, the spare storage resource at least partially powered on before transitioning the spare storage resource into the active storage resource; and
      based on the spare storage resource not functioning properly, spin down the spare storage resource, the spare storage resource being at least partially powered on.

5. The information handling system of claim 4, wherein the array of storage resources comprises a redundant array of independent disks (RAID).

6. The information handling system of claim 4, wherein evaluating the condition of the spare storage resource comprises determining whether the spare storage resource is an active spare storage resource, an inactive spare storage resource, or an unhealthy storage resource.

7. A system for power management of storage resources, comprising:
   a spare storage resource disposed in an array of storage resources; and
   a power management module communicatively coupled to the spare storage resource and operable to:

detect an issuance of a configuration command associated with the spare storage resource, the spare storage resource being at least partially powered on and in a spun down state;

based on the issuance of the configuration command, spin up the spare storage resource from the spun down state and evaluate the condition of the spare storage resource to determine whether the spare storage resource is functioning properly;

based on the spare storage resource functioning properly, execute the configuration command to transition the spare storage resource into an active storage resource, the spare storage resource at least partially powered on before transitioning the spare storage resource into the active storage resource; and based on the spare storage resource not functioning properly, spin down the spare storage resource, the spare storage resource being at least partially powered on.

8. The system of claim 7, wherein the array of storage resources comprises a redundant array of independent disks (RAID).

9. The system of claim 7, wherein evaluating the condition of the spare storage resource comprises determining whether the spare storage resource is an active spare storage resource, an inactive spare storage resource, or an unhealthy storage resource.

* * * * *